March 24, 1936.  K. MORITA  2,034,987
PROCESS FOR COATING GLASS SHEETS
Filed May 28, 1932
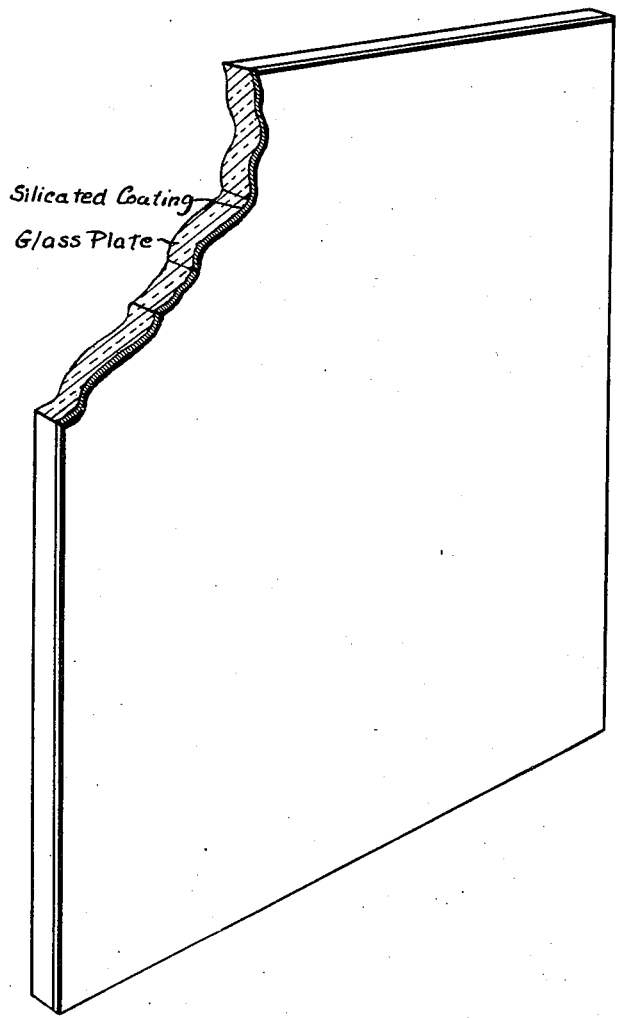
Inventor:-
Kikujiro Morita
by [signature]
Atty.

Patented Mar. 24, 1936

2,034,987

UNITED STATES PATENT OFFICE 2,034,987

PROCESS FOR COATING GLASS SHEETS

Kikujiro Morita, Paris, France

Application May 28, 1932, Serial No. 614,304
In Germany June 12, 1931

2 Claims. (Cl. 91—70)

The object of the present invention is a process for the lining of surfaces with glass plates.

Glass presents numerous advantages over china or earthenware which are at present used for lining surfaces. Given a certain surface glass is more economical; it lends itself more readily to working and permits of more varied artistic effects on account of its transparency and of its plastic properties.

It has however not been possible to utilize glass for the lining of surfaces up to the present for there is no cement known which will bind with it and which will make it possible to fix it solidly and permanently. It is true adhesives are known which bind permanently with glass, such as mixtures of silicate of soda and zinc oxide. Experiment has proved however that these adhesives were in no way suitable for the sealing of plates of glass and that if they did bind to the glass they did not bind onto plaster nor onto dry or damp cements.

The present invention is based on the fact, established by the applicant, that if a silicated coating is applied on a plate of glass and is allowed to dry, an opaque plate is obtained the coated surface of which can be sealed onto any sort of surface with plaster or cement.

According to the invention the silicated coating substance is made up of a mixture of silicate of soda and of zinc oxide, or of silicate of soda and magnesia, or of a mixture of silicate of soda and alumina. Mixtures of fluosilicate of soda and zinc oxide may also be used for this purpose. Said mixtures may receive an addition of oxidated titanium, of lithopone, of ferric oxide or of any other pigment intended to provide the glass with any desired color or tint. By placing alongside one another plates of glass coated with different or diversely colored compositions it is possible to obtain a polychromic facing of glass possessed of varied artistic effects.

A typical example according to my invention is shown in the attached drawing, consisting of a single perspective view with parts broken away in section, the component elements of my construction being indicated by suitable legends.

An example of the application of the above described process is given hereunder.

One hundred grams of silicate of sodium lye or water glass at 32° Baumé is mixed with thirty grams of oxide of zinc thus producing a fairly fluid paste which is spread in the form of a thin coating on a plate of glass with a spatula. Thus coating on the plate is heated for a few hours at a temperature of 40° centigrade; it is then heated for a suitable period at a temperature of at least 100° centigrade; after this treatment the coating adheres perfectly to the plate which can be sealed with the help of plaster or of cement to the surface it is intended to line.

As a result of the application of the method of operation hereinabove described a layer having a smooth surface is obtained on the plate. However it may be desirable, in order to increase the adhesion of the plate to the surface it is desired to line, to make the coating layer rough by the application of suitable mechanical means, for instance by treating the surface of said coat with brushes or combs.

What I claim is:

1. A process for coating glass sheets, comprising coating the glass on one of its faces with a coating selected from the group consisting of algaline silicates and fluosilicates and containing a materal from the group consisting of zinc oxide, magnesia, and alumina, and converting the mixture into a hard coating chemically impervious to adhesives and capable of adhering thereto, by heating the mixture, first at a low temperature stage in the order of 40° C., and by thereafter heating it at a second temperature stage in the order of 100° C.

2. A process for coating glass sheets, comprising coating the glass on one of its faces with a coating selected from the group consisting of alkaline silicates and fluosilicates and containing a metal oxide, and converting the mixture into a hard coating chemically impervious to adhesives and capable of adhering thereto, by heating the mixture, first at a low temperature stage in the order of 40° C., and by thereafter heating it a second temperature stage in the order of 100° C.

KIKUJIRO MORITA.